(12) United States Patent
    Frame

(10) Patent No.: US 8,157,887 B2
(45) Date of Patent: Apr. 17, 2012

(54) METAL RECOVERY SYSTEM

(76) Inventor: Scott William Frame, Anniston, AL (US)

( * ) Notice: Subject to any disclaimer, the term of this patent is extended or adjusted under 35 U.S.C. 154(b) by 42 days.

(21) Appl. No.: 12/852,043

(22) Filed: Aug. 6, 2010

(65) Prior Publication Data

US 2012/0031235 A1     Feb. 9, 2012

(51) Int. Cl.
    *C22B 1/00*     (2006.01)
(52) U.S. Cl. ........... 75/401; 266/178; 266/205; 266/901
(58) Field of Classification Search .................... 75/401; 266/205, 901, 178
    See application file for complete search history.

(56) References Cited

U.S. PATENT DOCUMENTS 5,619,934 A * 4/1997 Yen ................................. 110/235

* cited by examiner

*Primary Examiner* — George Wyszomierski
*Assistant Examiner* — Tima M McGuthry Banks
(74) *Attorney, Agent, or Firm* — C. Brandon Browning; Maynard Cooper & Gate, PC

(57) ABSTRACT

A thermal system for separating out co-mingled metals in almost pure form, the system including a tunnel kiln having temperature zones through which the co-mingled metals are conveyed and progressively heated until at least one metal of the co-mingled metals melts thereby separating the melted metal from the other metal or metals of the co-mingled metals. The system includes molten metal catch basins for collecting the melted metal which are arranged beneath a conveyor on which the co-mingled metals are transported within the kiln. The catch basins are tapped to the outside of the kiln so that as the various metals melt out at progressively higher temperatures, they can be collected into cast iron chills or other collection devices to form pure ingots.

19 Claims, 6 Drawing Sheets

US 8,157,887 B2

METAL RECOVERY SYSTEM

FIELD OF THE INVENTION

The present invention is generally directed to a system and method for recovering metals. More particularly, the present invention is directed to a metal recovery system for recovering copper, aluminum and iron from scrapped electrical motors.

BACKGROUND OF THE INVENTION

A tunnel kiln is an elongated kiln or oven normally made of refractory material, through which ware such as brick, tile and like material may be continuously processed and transported as it is subjected to desired heating conditions. The ware is commonly transported through a tunnel kiln on flatbed ware cars which roll on rails extending through the length of the tunnel. The kiln is normally operated so that the tunnel is full of ware cars bumper to bumper. At certain intervals a new car is pushed into the entrance of the tunnel thereby ejecting a fully processed car of ware from the exit of the tunnel.

Tunnel kilns are commonly divided into successive zones or sections in which the temperature, atmospheric conditions and air circulation can be controlled to effect efficient heat treatment. These sections include a preheating section, a firing section and a cooling section. The maximum temperature of the kiln is found in the firing section. The heat for the preheat section is supplied primarily by the hot gases drafted from the firing section. Supplementary heat is added by booster burners positioned in the preheat section. Angled baffles with pivotable dampers are positioned within the preheat section in the path of the hot exhaust gas to distribute the hot gases as desired throughout the preheat section. In this manner the desired degree of preheat can be controllably applied in a uniform way through the preheat section.

The chief advantage of a tunnel kiln resides in the fact that the ware is processed continuously with a counter-current flow to the exhaust, thereby yielding excellent fuel efficiency and a high volume of production with a minimum of handling of the ware. The present invention takes advantage of the benefits of current tunnel kiln designs to process and separate co-mingled metals into their distinct constituents.

SUMMARY OF THE INVENTION

Metals in an appliance are often at the end of an appliance's life found intimately comingled such that they are virtually useless and worthless. This is especially true for electric motors, for example, the starter motor, generator and the smaller motors for windows and wipers found in automobiles. These metal objects consist primarily of steel and copper windings and sometimes aluminum. In the car shredding business, these objects are called "copper meatballs."

The present invention is directed to thermal system for separating out co-mingled metals such as copper meatballs in almost pure form. Generally, the system includes a tunnel kiln having temperature zones through which the co-mingled metals are conveyed and progressively heated until at least one metal of the co-mingled metals melts and drains from the remaining metals. The tunnel kiln of the present invention can be one of any conventional tunnel kiln designs, for example, as described in U.S. Pat. Nos. 4,005,981; 4,053,278; 4,177,035; 4,856,987; and 4,884,969, the disclosures of which are incorporated by reference herein in their entireties, provided that the designs are modified to include means for directing and collecting the molten metal. To that end, the tunnel kiln of the present invention differs from conventional tunnel kilns in that the present invention includes molten metal catch basins for collecting the melted metal that are arranged beneath a conveyor on which the co-mingled metals are transported and melted within the kiln. The catch basins are tapped to the outside of the kiln so that as the various metals melt out at progressively higher temperatures they can be collected into cast iron chills or other devices to form pure ingots.

According to one aspect of the invention there is provided a method for separating co-mingled metals containing a first metal and a second metal. The method includes conveying the co-mingled metals on a conveyor within a kiln, melting the first metal in the kiln without melting the second metal, passing the melted first metal through openings in the conveyor, and collecting the melted first metal. The melted first metal is collected on a bank of refractory plates arranged within the kiln and channeled from there into a plurality of molds located outside of the kiln. Thereafter, the second metal is cooled and removed from a top surface of the conveyor manually, for example by hand, or magnetically.

According to another aspect of the invention there is provided a method for separating co-mingled metals containing a first metal and a second metal. The method includes conveying the co-mingled metals through a tunnel kiln and gradually heating the co-mingled metals for a first period within the tunnel kiln to a first temperature that is above the melting temperature of the first metal and below that of the second metal. Thereafter, the co-mingled metals are maintained at the first temperature within the tunnel kiln for a second period during which the first metal is melted to separate the first metal from the second metal. The melted first metal is then passed to a system that directs the molten metal to a series of molds where the second metal is solidified into ingots. The second metal and any remaining metals mingled therewith are likewise conveyed to a cooling section of the kiln and cooled.

According to yet another aspect of the invention there is depicted a tunnel kiln for separating co-mingled metals containing a first metal and a second metal. The kiln includes an elongate housing including a pre-heat zone, a fire zone containing a heat source and then a cooling zone. A conveyor is provided for conveying the co-mingled metals through the pre-heat zone, fire zone and cooling zone, the conveyor having a plurality of openings therethrough. A molten metal collection device is arranged beneath the conveyor for collecting the first metal after it melts. The device is composed of a plurality of high temperature plates operatively coupled to a plurality of molds. Channels are formed by the plates which are operatively coupled to a set of molds configured for cooling the melted first metal.

DETAILED DESCRIPTION OF PRESENTLY PREFERRED EMBODIMENTS

Figure 4:
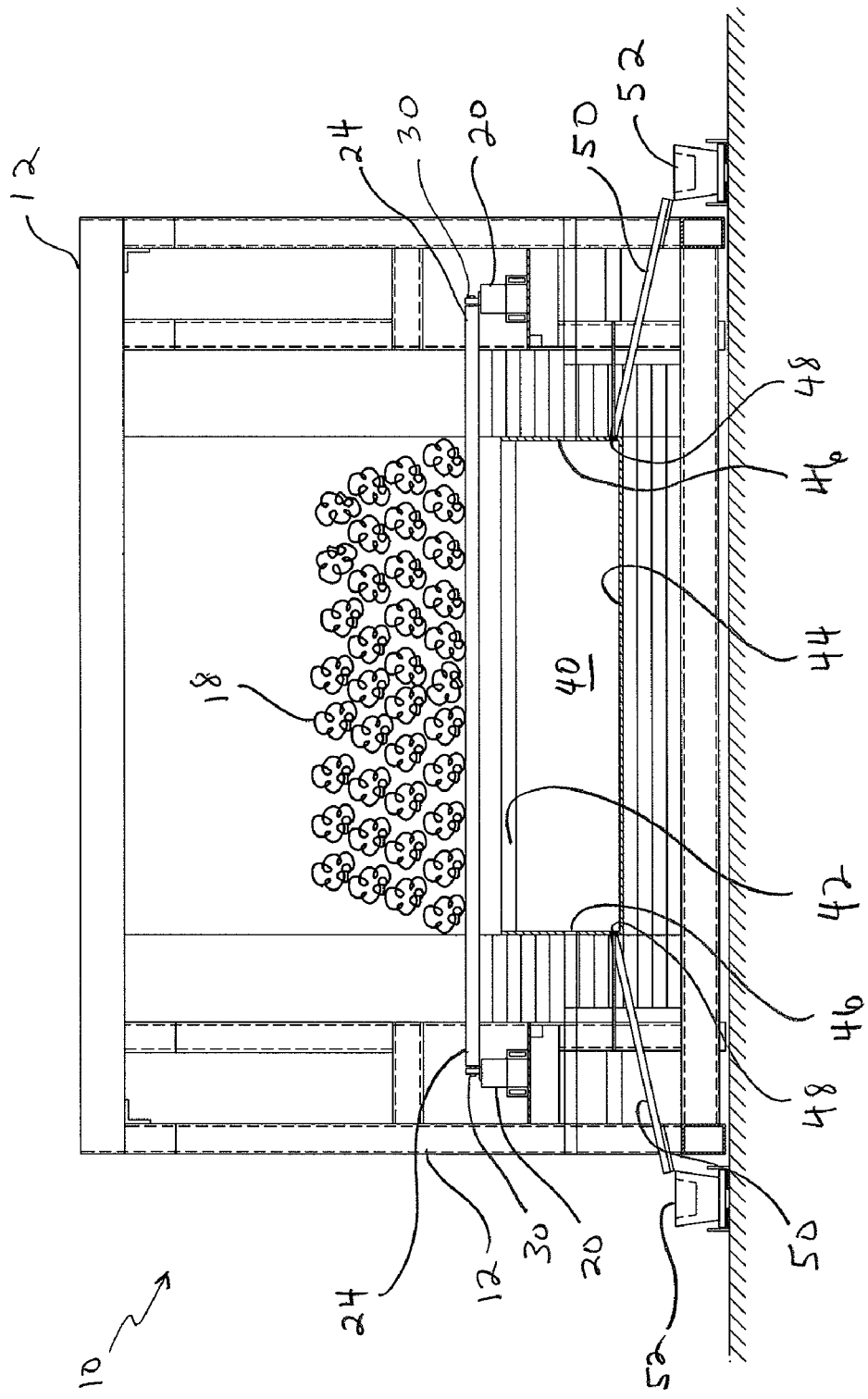
FIG. 4 is a sectional view of the fire zone of the tunnel kiln of FIG. 1.
Figure 5:
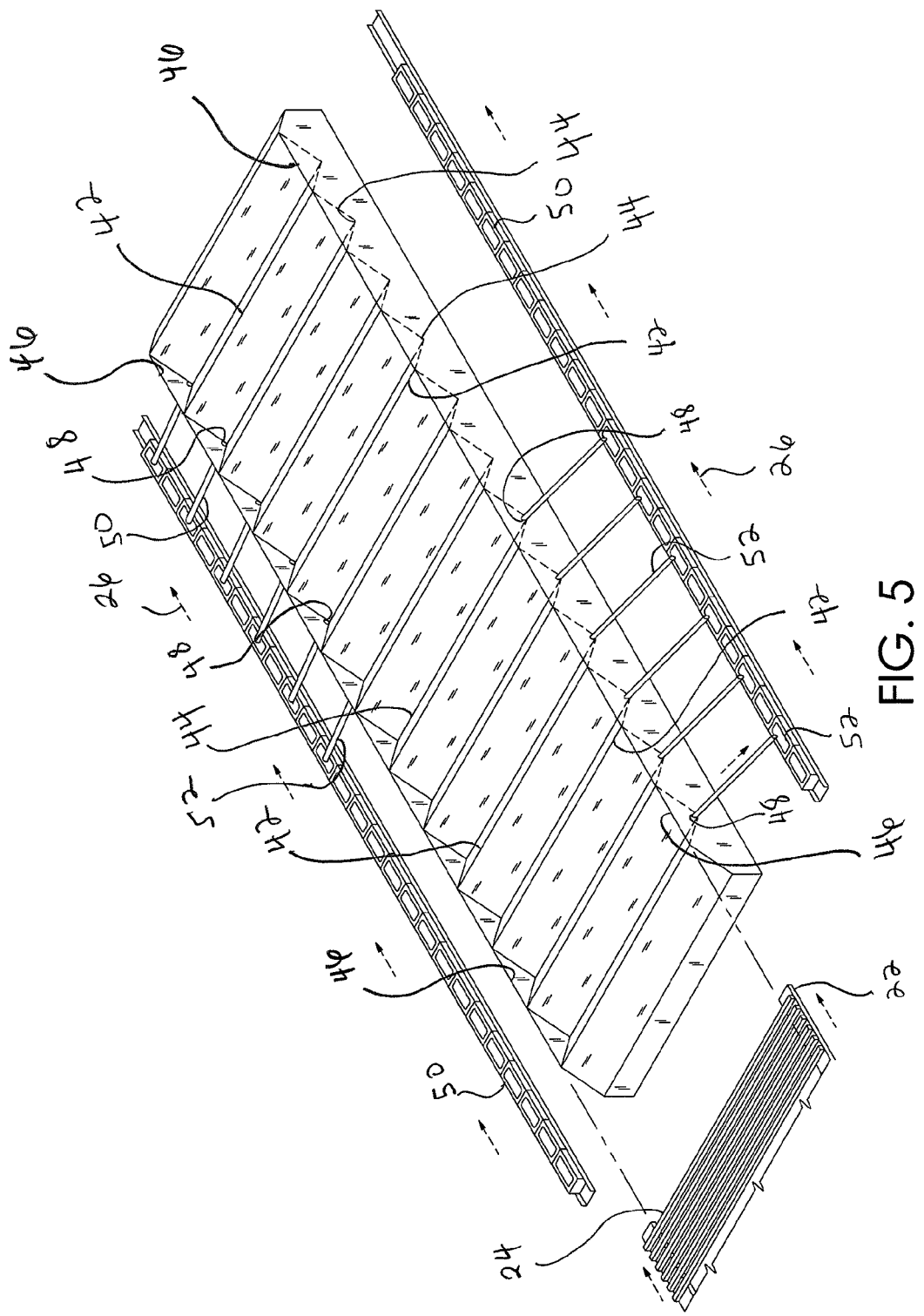
FIG. 5 is a perspective view of the molten metal collection system of the tunnel kiln of FIG. 1.
Figure 6:
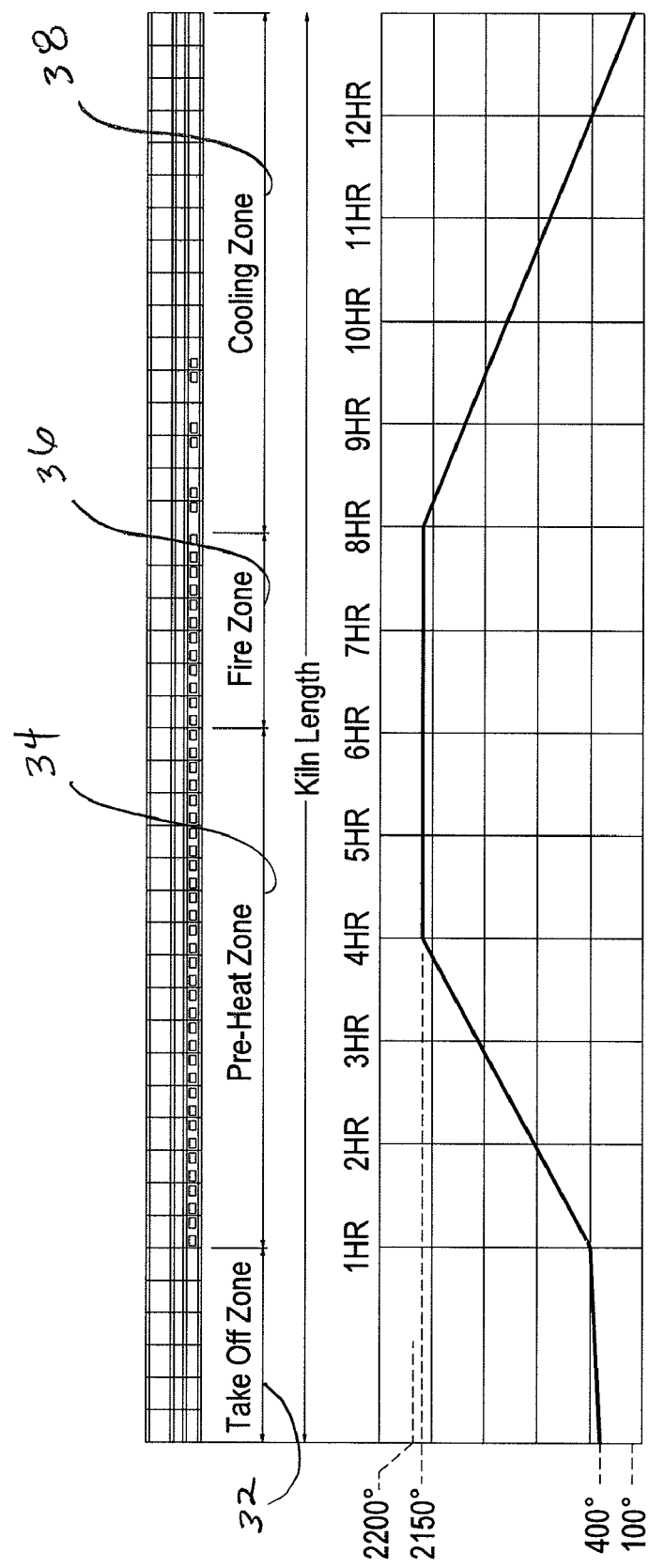
FIG. 6 depicts the time/temperature curve for the tunnel kiln of FIG. 1.

FIGS. 1 through 5 depict a tunnel kiln 10 in accordance with a preferred embodiment of the present invention. FIG. 6 depicts a time/temperature curve of kiln 10 relative to the various zones into which kiln 10 is divided. Tunnel kiln 10 is of a conventional tunnel kiln design with the exception that it is modified to support and transport co-mingled metal units as they are melted and to collect the molten metal for subsequent cooling and forming into metal ingots. To that end, tunnel kiln 10 includes a unique continuous conveyor system configured to withstand the high temperatures required to melt certain constituents of the co-mingled metal such as copper and aluminum while allowing the molten metal to drain away from the remaining solid portions of the metal units. Tunnel kiln 10 further includes a unique molten metal collection system arranged underneath the conveyor system that is configured for receiving the molten metal from the conveyor and directing the molten metal into chills where the molten metal is cooled to form ingots.

Figure 1:
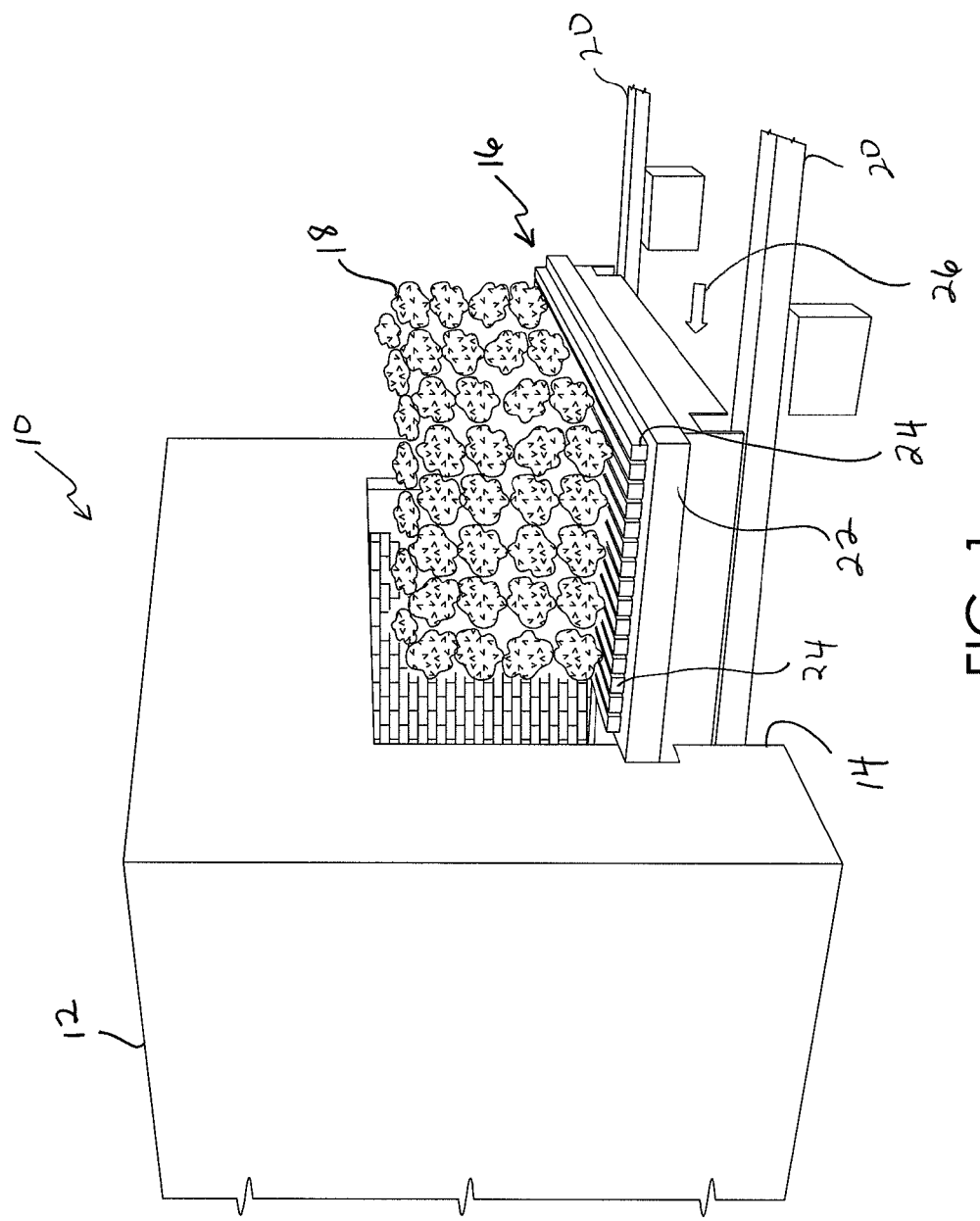
FIG. 1 is a perspective view of an entrance end of tunnel kiln and a conveyor therefore supporting co-mingled metal objects in accordance with a preferred embodiment of the present invention.

More particularly, as depicted in FIG. 1, tunnel kiln 10 is formed in a standard box manner to include an exterior enclosure 12 having a width of about 8 feet, a height of about 6 feet and a length of about 200 feet. Enclosure 10 includes an entrance 14 through which conveyor elements 16 supporting co-mingled metal units 18 are introduced into kiln 10 for melting and separating into their constituent parts. Conveyor elements 16 are supported on and directed through kiln 10 on a pair a parallel rails 20 that are elevated above the floor of kiln 10 a sufficient distance to allow for the positioning of the molten metal collection system between the kiln floor and the conveyor units 16 there above. Rails 16 extend through and around on side of enclosure 10 to form a continuous track upon which conveyor units 16 are moved into, through, out of and back into kiln 10.

Each conveyor unit 16 consists of a steel frame 22 having refractory bars 24 that span across frame 22 perpendicularly to a direction of travel 26 of conveyor units 16. Bars 24 are spaced apart from one another a sufficient distance, i.e., about ¼ inch, to allow for the support of co-mingled metal units 18 while allowing the molten metal drained therefrom to pass between spaces 28 formed between bars 24. To move frame 22 along rails 20, a wheel set 30 is provided on the underside of frame 22 at each corner thereof. Each wheel set 30 is arranged to roll upon one of rails 20 as conveyor units 16 are pushed downstream through kiln 10 by the introduction of additional conveyor units through entrance 14. In this manner, each conveyor unit 16 is pushed in direction of travel 26 by the adjacent up stream conveyor unit 16. Although rails 20 are shown in FIG. 1 to extend within enclosure 12 it is contemplated that rails 20 can run along the exterior of enclosure 12 in order to provide access to rails 20 and frame 22 if needed, while also partially shielding rails 20 and wheel sets 30 from the high temperature within enclosure 12.

Beginning with entrance 14 and ending at the exit of enclosure 12, kiln 10 is divided into several zones that are distinguishable from one another by the temperature within the zone. Moving in direction of travel 26, the zones include a take off zone 32, a pre-heat zone 34, a fire zone 36 and a cooling zone 38. These zones are graphically depicted in FIG. 6 and discussed in further detail hereafter. Except as otherwise described above, take off zone 32 and cooling zone 38 are of conventional tunnel kiln construction. Pre-heat zone 34 and fire zone 36, on the other hand, house the unique molten metal collection system.

Figure 2:
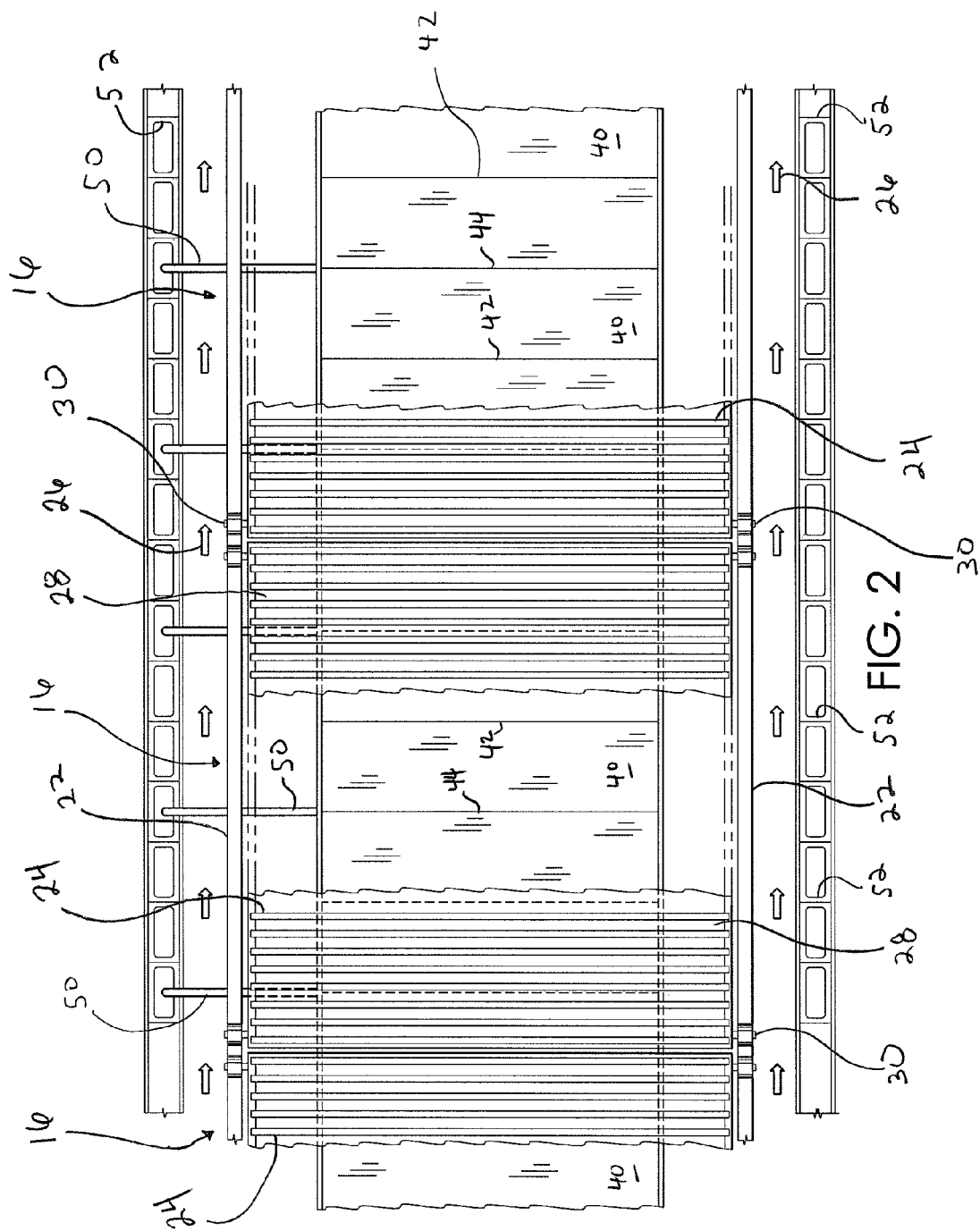
FIG. 2 is a top plan view of a fire section of the tunnel kiln of FIG. 1 with a top of the kiln and co-mingled metal objects removed.
Figure 3:
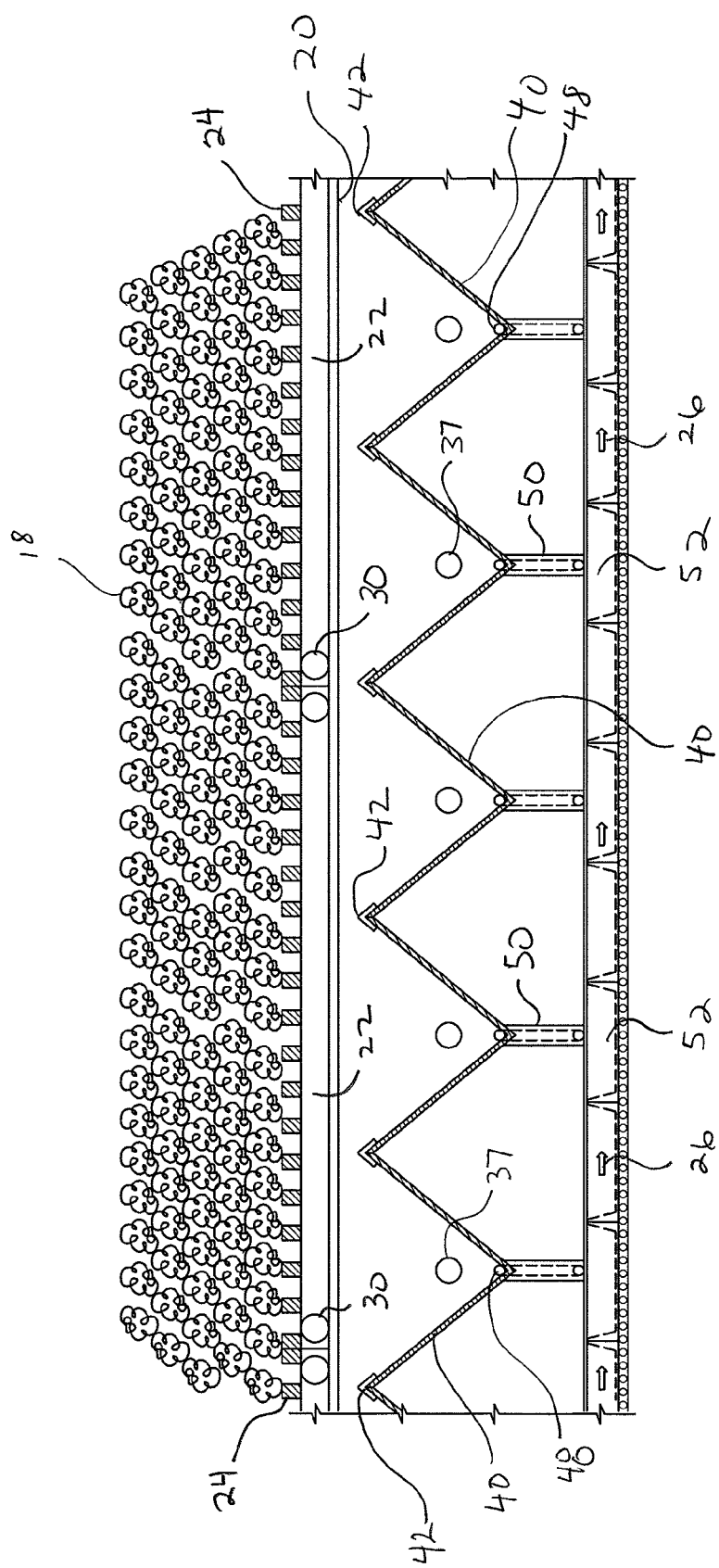
FIG. 3 is an elevational view of the fire zone of the tunnel kiln of FIG. 1 with a sidewall of the kiln removed.

Referring to FIGS. 2 through 4, there is depicted various views of pre-heat zone 34 and fire zone 36 of kiln 10. Zones 34 and 36 contain natural gas burners 37 for heating kiln 10 and the molten metal collection system. The molten metal collection system consists of a series of V-shaped refractory plates 40 extending parallel to one another and perpendicularly to, beneath and between rails 20. V-shaped refractory plates 40 are arranged so that a top edges 42 of adjacent refractory plates 40 abut one another so that a continuous length of refractory plates extends beneath rails 20 along the entire length of fire zone 36, as well as a portion of pre-heat zone 38. The flat surfaces of each V-shaped refractory collector plate 40 are arranged to receive molten metal drained from co-mingled metal units 18 as the molten metal passes through spaces 28 between refractory bars 24. As best depicted in FIG. 5, a trough 44 is formed at the vertex of each refractory plate which collects the molten metal from the flat surfaces of plates 40. Burners 37 are arranged below rails 20 and just above each trough 44 in order to ensure that refractory plates 40 remain sufficiently hot to maintain the molten metal molten. End plates 46 disposed at each end of plates 40 work to contain the molten metal within troughs 44.

Located at one end of each trough 40 through one of end plates 46 is a 1 inch opening 48. Opening 48 is selectively opened and closed using a pneumatic cylinder or other actuating device controlled by a timer or similar device. When openings 48 are closed, a desired amount of molten metal is allowed to accumulate within troughs 44. When openings 48 are opened, the molten metal drains through each opened opening 48 into a short channel 50 that directs the molten metal outside of the enclosure 12 to a series of cast iron chills 52 where the molten metal is cooled to form solid ingots.

Chills 52 are arranged end to end in a continuous line on each lateral side of enclosure 12 thus forming a chain. Chills 52 are driven in a conventional conveyor belt fashion with an upper band of chills constantly moving in direction of travel 26 along side the V-shaped refractory plates 40 where they receive molten metal. At the downstream end of the chain of chills 52, each chill 52 is successively rotated downward and directed below the upper band of chill 52 and sent upstream back in the direction of entrance 14 of enclosure 12. At the point a chill 52 is directed downward and then inverted the ingot housed therein falls from the chill thus allowing it to be collected.

The present invention is further described in the context of the following Example.

EXAMPLE

Referring to FIG. 6 there is depicted a time/temperature curve for a tunnel kiln according the present invention that is designed for separating co-mingled aluminum, copper and iron from one another. This is accomplished by passing the co-mingled metals through tunnel kiln 10 at a constant rate and varying the temperature of kiln 10 and zones 32, 34, 36 and 38.

In this particular example, co-mingled metal units 18 containing aluminum, copper and iron are loaded onto refractory bars 24 of a conveyor element 16 and introduced into take off zone 32 of kiln 10 through entrance 14. Within take off zone, comingled metal units 18 are steadily heated from room temperature to about 400 degrees F. as they move in direction of travel 26. This step takes 1-hour to complete.

After pre-heat zone 34, comingled metal units 18 are pushed into pre-heat zone 34 where they are heated from 400 degrees F. up to 2,150 degrees F. in the span of 3 hours. During this rise in temperature the aluminum in comingled metal units 18 begins to melt and drain through spaces 28 in bars 24 once the temperature reaches the meting point of aluminum or 1220 degrees F. This typically begins to occur after the co-mingled metal units have been within pre-heat zone 34 for about 1.5 hours.

Since the aluminum begins to melt out of comingled metal units 18 at this point, V-shaped refractory plates 40 of the molten metal collection system are provided in preheat zone 34 under rails 20 slightly before the location where the aluminum begins to melt. The melted aluminum is collected in troughs 44 of refractory plates 40 where it accumulates to a desired amount before it is directed to chills 52 through opening 48 and channel 50. As the aluminum filled chills 52 move in direction of travel 26, the aluminum cools within chills 52 to form solid aluminum ingots. The aluminum ingots reside in chills 52 until each respective chill 52 reaches the downstream end of the chain of chills 52 and is inverted whereupon gravity separates the ingot from the chill.

By the time co-mingled metal units 18 reach the melting point for copper, i.e., 1,983 degrees F., all of the aluminum is melted and drained away from the co-mingled metal units. The melting point of the copper in co-mingled metal units 18 is reached after units 18 have been in preheat zone 34 for about 3 hours. At this point, the cooper in the co-mingled metal units begin to melt out of metal units 18 and drain through spaces 28 between bars 24 before being collected by the molten metal collection system and directed to chills 52 for cooling. The temperature of co-mingled metal units 18 is maximized in the preheat zone at about 2,150 degrees F. at the 4 hour mark. Metal units 18 are maintained at this temperature until the eight hour mark to ensure complete removal of the copper. At this temperature, the atmosphere in kiln 10 is made slightly reducing to prevent oxidation of the iron and copper by finely adjusting burners 37.

At the six hour mark, the co-mingled metal units pass into fire zone 36 where they remain for 2 more hours to the 8 hour mark. Once the metal units reach the 8 hour mark all of the copper has been removed from the metal units leaving only iron scrap that is supported on refractory bars 24.

Following heating in fire zone 36, the remaining iron metal units are cooled within cooling zone 38 of kiln 10 over a period of five hours. During this time, the iron is cooled from about 2,150 degrees F. to about 100 degrees F. Once cooled the iron can be removed from conveyor elements 16 by hand or magnetically.

As will be apparent to one skilled in the art, various modifications can be made within the scope of the aforesaid description. Such modifications being within the ability of one skilled in the art form a part of the present invention and are embraced by the claims below.

It is claimed:

1. A method for separating co-mingled metals containing a first metal and a second metal comprising,
    conveying the co-mingled metals on a conveyor within a kiln,
    melting the first metal in the kiln without melting the second metal,
    passing the melted first metal through openings in the conveyor,
    collecting the melted first metal, wherein the melted first metal is collected on angled plates arranged within the kiln beneath the conveyor, and
    channeling the melted first metal from the angled plates into a plurality of molds located outside of the kiln.

2. The method according to claim 1 wherein the kiln is a tunnel kiln.

3. The method according to claim 1 further comprising removing the second metal from a top surface of the conveyor following the melting of the first metal.

4. The method according to claim 1 wherein the first metal is copper and the second metal is iron.

5. The method according to claim 4 wherein the co-mingled metals are derived from automobile starter motors, generators, windshield wiper motors or combinations thereof.

6. The method according to claim 1 wherein, when the co-mingled metals contain a third metal, melting the third metal within in the kiln before melting the second metal, passing the melted third metal through the openings in the conveyor and collecting the melted third metal apart from the first metal and the second metal.

7. A method for separating co-mingled metals containing a first metal and a second metal comprising,
    conveying the co-mingled metals through a tunnel kiln,
    gradually heating the co-mingled metals for a first period within the tunnel kiln to a first temperature that is above the melting temperature of the first metal and below that of the second metal,
    maintaining the co-mingled metals at about the first temperature within the tunnel kiln for a second period,
    melting the first metal within the tunnel kiln to separate the first metal from the second metal, and
    cooling the second metal for a third period within the tunnel kiln.

8. The method according to claim 7 further comprising passing the melted first metal to a bank of elongate V-shaped plates.

9. The method according to claim 7 wherein the co-mingled metals are conveyed continuously through the tunnel kiln.

10. The method according to claim 7 wherein each of the first period, the second period and the third period ranges between about 2.5 and about 5 hours.

11. The method according to claim 7 wherein the first temperature ranges between about 2,000° F. and about 2,200° F.

12. The method according to claim 7 wherein the co-mingled metals are derived from electrical motors.

13. A tunnel kiln for separating co-mingled metals containing a first metal and a second metal comprising,
    an elongate housing including a pre-heat zone, a fire zone containing a heat source and a cooling zone,
    a conveyor for conveying the co-mingled metals through the pre-heat zone, the fire zone and the cooling zone, the conveyor having a plurality of openings therethrough, and
    a molten metal collection device arranged beneath the conveyor for collecting the first metal after it melts,
    wherein the molten metal collection device comprises a plurality of high temperature plates operatively coupled to a plurality of molds.

14. A tunnel kiln for separating co-mingled metals containing a first metal and a second metal comprising,
    an elongate housing including a pre-heat zone, a fire zone containing a heat source and a cooling zone,
    a conveyor for conveying the co-mingled metals through the pre-heat zone, the fire zone and the cooling zone, the conveyor having a plurality of openings therethrough, and a molten metal collection device arranged beneath the conveyor for collecting the first metal after it melts, wherein the molten metal collection device is comprised of V-shaped plates arranged substantially parallel to one another.

15. The apparatus according to claim 14 wherein a channel is formed between adjacent pairs of the plates, each channel being operatively coupled to a mold configured for cooling the melted first metal.

16. The apparatus according to claim 14 wherein the plates extend substantially perpendicularly to a direction of movement of the conveyor.

17. A tunnel kiln for separating co-mingled metals containing a first metal and a second metal comprising, an elongate housing including a pre-heat zone, a fire zone containing a heat source and a cooling zone, a conveyor for conveying the co-mingled metals through the pre-heat zone, the fire zone and the cooling zone, the conveyor having a plurality of openings therethrough, and a molten metal collection device arranged beneath the conveyor for collecting the first metal after it melts, wherein the molten metal collection device is operatively coupled to a plurality of molds located outside of the kiln.

18. A tunnel kiln for separating co-mingled metals containing a first metal and a second metal comprising, an elongate housing including a pre-heat zone, a fire zone containing a heat source and a cooling zone, a conveyor for conveying the co-mingled metals through the pre-heat zone, the fire zone and the cooling zone, the conveyor having a plurality of openings therethrough, a molten metal collection device arranged beneath the conveyor for collecting the first metal after it melts, wherein the molten metal collection device supports a portion of the melted first metal, and a mold located outside of the tunnel kiln that contains another portion of the melted first metal, wherein the molten metal collection device supports a portion of the melted first metal.

19. A tunnel kiln for separating co-mingled metals containing a first metal and a second metal comprising, an elongate housing including a pre-heat zone, a fire zone containing a heat source and a cooling zone, a conveyor for conveying the co-mingled metals through the pre-heat zone, the fire zone and the cooling zone, the conveyor having a plurality of openings therethrough, and a molten metal collection device arranged beneath the conveyor for collecting the first metal after it melts, wherein the atmosphere in the fire zone is a reducing atmosphere.

* * * * *